Aug. 8, 1944. E. B. MOORE 2,355,094
APPARATUS FOR MAKING BEVERAGES
Filed Sept. 21, 1940 3 Sheets-Sheet 1
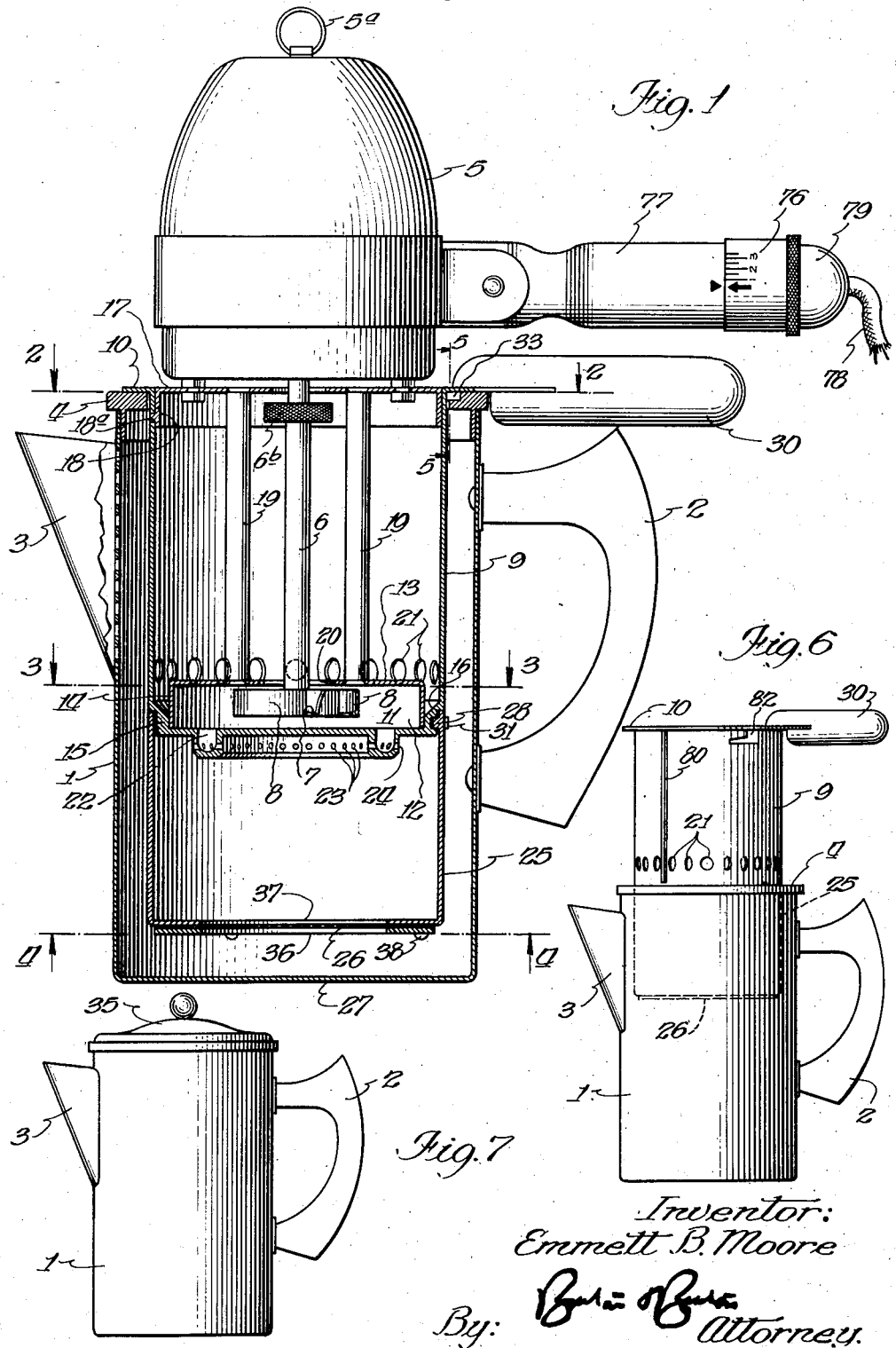
Inventor:
Emmett B. Moore

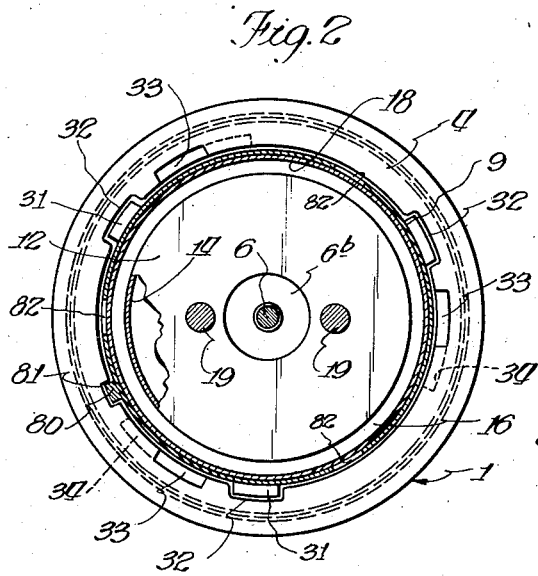
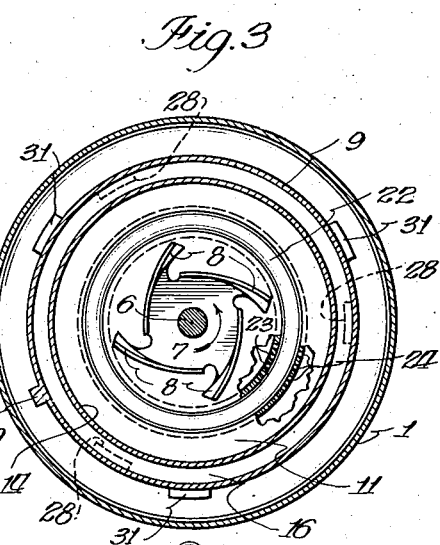
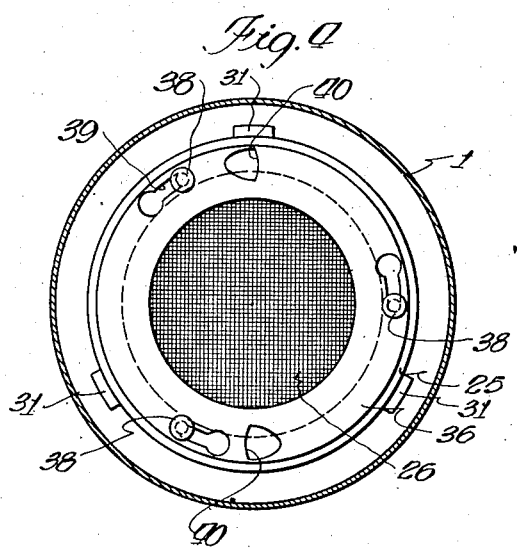
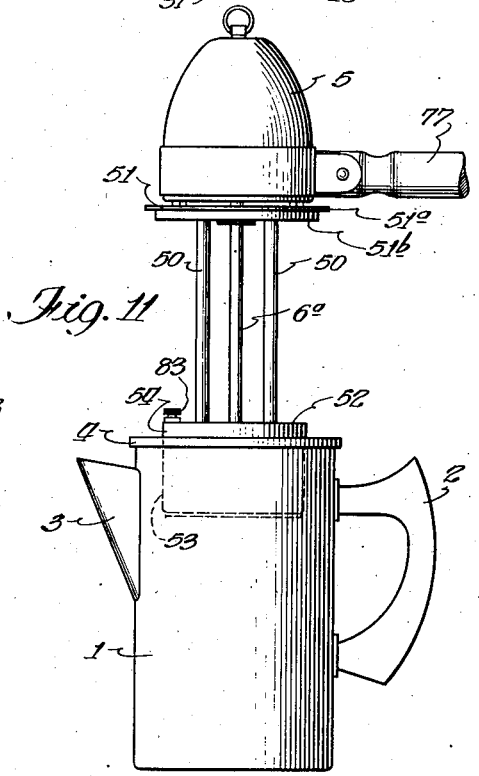
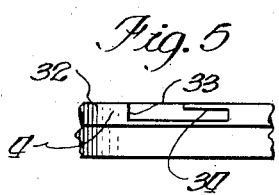

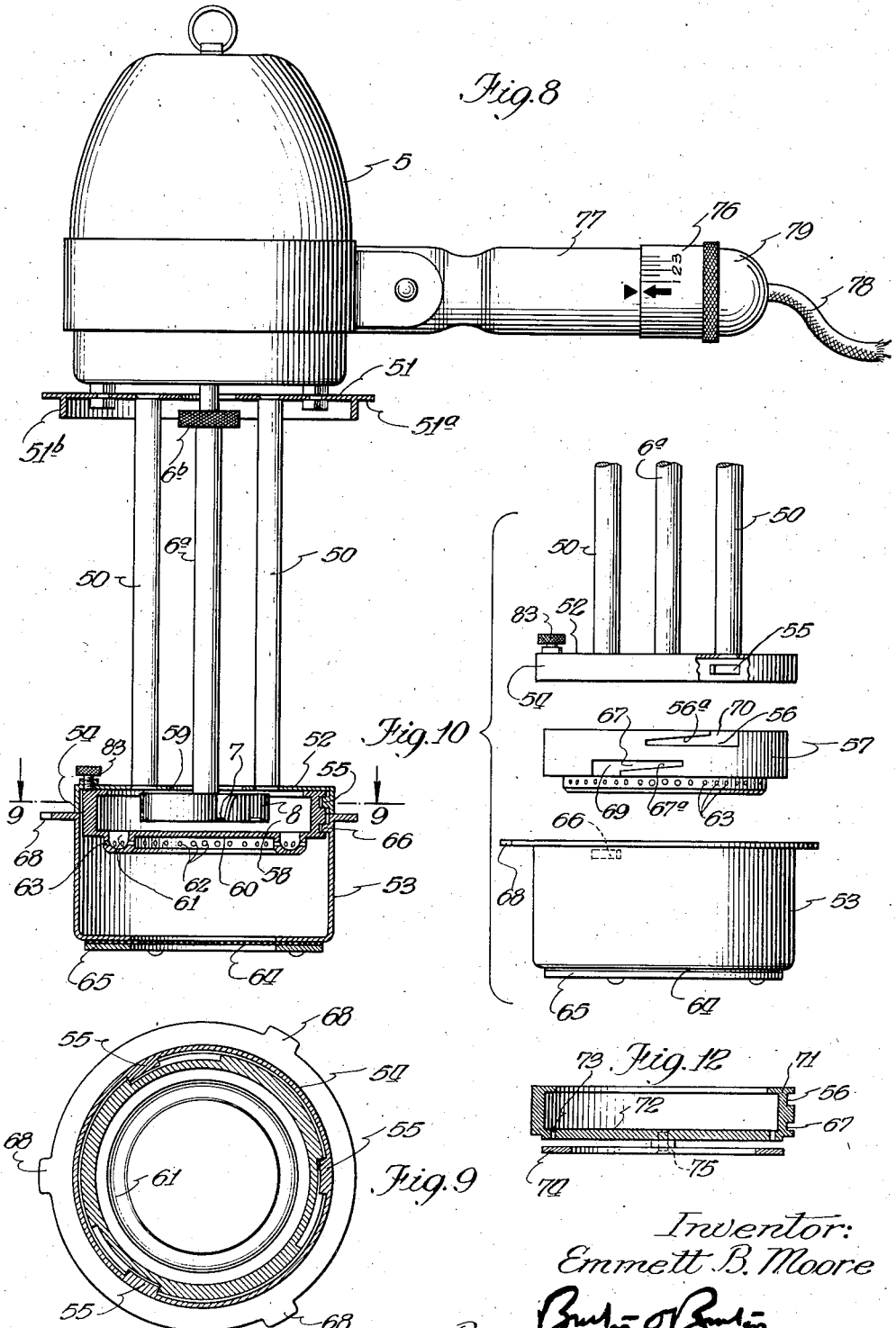

Patented Aug. 8, 1944

2,355,094

UNITED STATES PATENT OFFICE 2,355,094

APPARATUS FOR MAKING BEVERAGES

Emmett B. Moore, Evanston, Ill.

Application September 21, 1940, Serial No. 357,772

5 Claims. (Cl. 99—302)

This invention relates to the making of beverages such as coffee, in which the flavor is obtained by treating solid matter, such as the ground coffee bean, with a liquid, usually hot or boiling water.

One object of the invention is to provide apparatus for producing a full flavored coffee from which the less desirable oils and other ingredients of the coffee bean are omitted.

Another object is to provide an apparatus capable of producing a satisfactory beverage of this character in a shorter time than has been possible by methods previously known.

A further object is to provide a relatively simple apparatus, easy to operate and to cleanse, and not particularly expensive to manufacture.

Other objects and advantages will appear as the description proceeds.

The invention thus consists in certain features and elements of construction in combination, and in certain steps and methods of procedure, as hereinafter described and illustrated in the drawings and as indicated by the claims.

In the drawings:

Figure 1 is a substantially axial section of a coffee pot with apparatus mounted therein for mixing the solid particles of coffee and the hot liquid to produce a beverage brew.

Figure 2 is a transverse section taken substantially as indicated at line 2—2 on Figure 1, and showing the top flange of the coffee pot upon which the other portions of the apparatus are removably supported.

Figure 3 is a transverse section taken substantially as indicated at line 3—3 on Figure 1, showing the rotary impeller within its confining housing.

Figure 4 is taken as a section at line 4—4 on Figure 1 and shows the coffee-containing vessel in bottom plan view.

Figure 5 is a detail section taken as indicated at line 5—5 on Figure 2.

Figure 6 is a side elevation of the coffee pot with the mixing motor removed, and with the coffee container shifted above the liquid level.

Figure 7 is a side elevation of the coffee pot with all the removable parts taken out and with a lid applied thereto as for table service.

Figure 8 is a substantially axial section showing a modified form of impeller chamber associated with the coffee container.

Figure 9 is a transverse section taken substantially as indicated at line 9—9 on Figure 8.

Figure 10 is a fragmentary elevation showing certain parts of the structure in Figure 1 in disassembled relation.

Figure 11 is a side elevation of the structure of Figure 8 as adjusted to draining position in a coffee pot.

Figure 12 is a substantially diametral section of a modified construction for an impeller chamber to be substituted for that shown in Figure 8.

In the form of the invention illustrated in Figures 1 to 5 the coffee pot 1 is shown as a simple cylindrical receptacle having a handle 2 and pouring spout 3, and surmounted by a rim flange 4. The mixing apparatus is suspended within the receptacle 1 except for a driving motor 5 which is disposed above it, with its shaft 6 extending in substantially axial position within the cavity of the receptacle 1. At its lower end the shaft carries a rotary impeller 7 having blades 8 which are formed to produce a flow outwardly and downwardly therefrom. A cylinder 9, formed with a flange 10 which rests upon the rim flange 4 of the coffee pot, is thus suspended with clearance within the receptacle 1, and the bottom wall 11 of this cylinder 9 is also the bottom of a chamber 12 which encloses the impeller 7. The top wall 13 of the chamber 12 is formed with a lateral flange 14 which fits snugly against the bottom wall 11 and within a reduced portion 15 which meets the side wall of the cylinder 9 in an inclined or conical connecting portion 16 serving to steer the flanged part 13 into position when the motor is assembled with the cylinder 9. The motor is attached to a plate 17 having a peripheral flange 18 which fits snugly within the cylinder 9 and thus steadies the motor in its position. The flange 18 may have lugs 18ª which engage bayonet slots 8² in the cylinder 9 (see Figure 6) to lock the motor in position. Connecting posts 19 extend between the wall 13 and the plate 17 for spacing them properly and supporting the motor just above the rim 4 of the coffee pot.

The upper wall 13 of the chamber 12 is formed with a central inlet opening 20, and at about the same level the cylinder 9 is provided with inlet apertures 21 so that liquid standing in the receptacle 1 in the clearance space between its wall and the cylinder 9 is afforded access to the impeller chamber 12 by way of the inlets 21 and the opening 20. When the motor is running, such liquid, filling the chamber 12, is fed outwardly from the central portion of the chamber and downwardly into an annular channel 22 formed in the bottom wall 11 and provided with a plurality of small outlet apertures 23, directed laterally from the inner side of the channel 22 and additional apertures 24 directed laterally from the outer side of the channel. The impeller thus creates a pressure which discharges the liquid laterally from these openings 23 and 24 so as to fill all available space within a vessel 25 which is suspended below the wall 11 and within the receptacle 1. This vessel is designed to contain a quantity of solid beverage-making material, such as ground or pulverized coffee, which is supported on a reticulated or perforated bottom 26 disposed above the bottom wall 27 of the receptacle 1, with ample clearance for the flow of liquid which is forced through the vessel 25 by the impeller 7. The lateral arrangement of the ports 23 and 24 insures that the jets of liquid will not be discharged into the body of solid material so as to bore their way through it, but the flow induced by the impeller 7 will rather tend to build up a pressure of liquid in the upper portion of the vessel 25, forcing the liquid downward through the entire mass of solid matter for discharge through the screen or perforated bottom wall 26.

In the process of preparing a beverage with this apparatus a quantity of water is placed in the receptacle 1 to be heated, and a quantity of granulated or pulverized coffee is placed in the vessel 25 which is open at the top but which includes bayonet lock lugs 28 for external connection with the part 15, so that it may thus be suspended from the cylinder 9. Either before or after heating the water, the cylinder 9 is lowered into the receptacle 1 with its flange 10 resting on the rim flange 4. With the water at the desired temperature, ordinarily approximating the boiling point, the motor unit, including the downwardly flanged wall 13 and the impeller 7 just below it, is lowered into the cylinder 9 so that the flange 14 fits snugly within flange 15, with the lower edge of the flange 14 sealing the pump chamber which is thus formed to enclose the impeller, as shown in Figure 1. The electric motor 5 is then operated for a short period; and usually, about one minute is sufficient to produce a satisfactory and palatable infusion of the coffee with the water in the receptacle 1.

As the impeller 7 rotates, the water, which readily flows into the chamber 12 by way of ports 21 and inlet 20, is circulated downwardly through the vessel 25 and its perforated lower portion, into the receptacle 1, in which it flows upwardly and back through apertures 21 and inlet 20, to the chamber 12 for repeated circulation in this path. Thus the same liquid is passed over and over in contact with the granular material in the vessel 25, disolving or carrying away in suspension additional quantities of this material with each re-circulation until a brew of proper strength is produced.

The motor 5 and its impeller 7 are then removed and the cylinder 9 is elevated to the position shown in Figure 6, its laterally projecting lugs 31 being lifted through the clearance openings 32 in the rim 10 and then seated in recesses 33. These recesses may be under-cut at one side, as indicated at 34, so that by limited rotation of the handle 30 the lugs 31 may be securely locked in position. Any liquid in the cylinder 9 above the holes 21 will drain through said holes 21 into the receptacle 1 as the cylinder is elevated therein, and liquid below these holes will drain into the vessel 25; the vessel 25, remaining attached to the cylinder 9 and suspended in the upper portion of the pot 1, will drain into the pot 1 through its perforated lower portion 26. The attachment of the cylinder 9 to the part 1 by means of the lugs 31 is secure enough so that the pot 1 may be tilted for pouring the coffee immediately, if desired, but, normally, after a brief period, sufficient to allow all the liquid to drain from the vessel 25, the cylinder 9 and the vessel 25 will be removed entirely from the pot 1, and an ordinary lid 35 will be applied to the flange 10 (as seen in Figure 7). If desired, this lid may have lugs similar to the lugs 31 for interlocking with the recesses.

Upon releasing the bayonet lock lugs 28 from the grooves with which they inter-member in the flange 15 the vessel 25 can be readily detached for removing the coffee grounds remaining therin, and the straight, cylindrical side wall of the vessel 25 greatly facilitates the cleansing which is easily completed by flushing the screen 26 with warm water. Preferably, the screen 26 is made as a unit, with its marginal portion soldered to a flat, annular frame 36, and this member may be removably attached to the bottom flange 37 of the vessel 25 by means of headed studs 38 (as seen in Figure 4), projecting from the flange 37 and interlocking with arcuate slots 39 in the frame member 36. Fingernail recesses 40, or other suitable means, may be provided for engaging the frame 36 to rotate it through a limited angle for releasing the heads of the studs 38 through the enlarged portions of the slots 39. With the construction shown in Figures 1 to 5 the motor and the impeller 7 can be readily separated from the cylinder 9 so that the impeller and the flanged wall 13 can be quickly cleansed by rinsing and drying. Similarly, the vessel 9 can be easily washed and dried, ready for further use.

A modified form of the structure is shown in Figures 8, 9 and 10, in which the supporting cylinder 9 is dispensed with. The members 50 connecting the top plate 51 with the top wall 52 of the impeller chamber serve to suspend this chamber and the attached vessel 53 within the coffee pot 1. The marginal portion 51a of the plate 51 rests on the top ring 4 of the coffee pot, with a depending flange 51b to position it. The marginal flange 54 of the part 52 is formed with lugs 55 which engage in bayonet slots 56 in the wall 57 of a shallow vessel which cooperates with the part 52 to form the chamber 58 enclosing the impeller 7. As in the first described structure, the wall 52 has a central opening shown at 59 around the shaft 6a of the impeller 7, which serves as an inlet for liquid, and the bottom wall 60 of the chamber 58 is formed with a channeled portion 61 having ports 62 discharging laterally and inwardly, and ports 63 discharging laterally and outwardly into the vessel 53. The bottom wall 64 of the vessel 53 may be of woven screen material or finely perforated metal, and may be removably secured by an annular frame ring 65, as in the other construction. The vessel 53 is formed with lugs 66 near its upper edge engaging in slots 67 of the side wall 57, as seen in Figure 8, so that the vessel 53 is suspended from the chamber 58 and the latter is suspended from the motor by the member 50. The vessel 53 may be formed with a flange or collar having radially extending lugs 68 dimensioned to fit in the recesses 33 of the top flange 4 when the pumping operation of the motor and its impeller 7 in the liquid has been completed and the parts are shifted to an elevated position, as shown in Figure 11.

The operation of this construction is, of course, identical with that already described, the granular or pulverized coffee in the vessel 53 being created for the extraction of its flavoring elements by the rapid circulation of the hot water in the pot 1 through the solid material. This circulation is induced by the rotation of the impeller 7 in the chamber 58, drawing the water in through the opening 59 and discharging it through the outlets 62 and 63, and eventually through the perforated bottom wall 64. Following this treatment, the motor, with the chamber 58 and vessel 53 connected thereto, is elevated to the position shown in Figure 11, and the motor and impeller may be immediately detached from the chamber 58, thus leaving the vessel 53 suspended in the upper part of the pot 1 for draining. When this is completed, the vessel 53, containing the dregs of the coffee, will be removed entirely from the pot 1, and the cover 35 may be applied, as shown in Figure 7.

As indicated in Figure 10, the bayonet slots 56 may have inclined side walls 56$^a$ to provide a slight wedging action for securing the chamber 58 firmly in position enclosing the chamber; and this securement may be supplemented by a clamping screw 83, positioned to impinge against the upper edge of the wall 57, as seen in Figure 8. Upon release of the screw 83 and limited rotation of the motor assembly, the lugs 55 are registered with the openings 70 of slots 56 so that the motor impeller may be readily removed. Figure 10 also indicates inclined side walls 67$^a$ for the bayonet slots 67, so that when the vessel 53 is applied to the part 57 there will be a slight wedging action to hold the vessel firmly in place. Limited reverse rotation will release the vessel 53 from the part 57 for emptying of the coffee grounds and cleansing of the parts.

Figure 12 shows a further modification which has to do with the form of outlet openings through which the liquid from the impeller chamber is fed into the coffee-containing vessel. In this form the side wall 71 of the impeller chamber is similar to that shown in Figures 8 and 10, but the bottom wall 72, instead of having a channeled formation, is provided with a plurality of outlets 73 arranged in a circle, and with a baffle ring 74 directly below the outlet 73 but spaced therefrom sufficiently to permit the liquid to escape past the inner and outer edges of the ring 74. This prevents the liquid from being forced directly into the mass of granulated or pulverized material in the vessel 53 and accomplishes substantially the same result as the laterally directed openings 23 and 24 of Figure 1, or 62 and 63 of Figure 8. As a convenient construction the ring 74 is shown secured in spaced relation to the bottom wall 72 by rivets 75 at two diametrically opposite points.

As a matter of convenience the motor shafts 6 and 6$^a$ are shown with knurled enlargements 6$^b$, so that the shaft may be grasped to facilitate removal of the impeller 7, if that should be necessary; and to permit the motor 5 to be hung up from a hook, if desired, it may be equipped with a suitable eye at the upper end, indicated at 5$^a$.

If desired, the motor may be equipped with a timing switch of any suitable, known construction, which may be installed, as shown at 76, as a part of the handle 77 attached to the motor 5; and the current supply cable 78 may be connected into the end of this handle by a separable plug 79. In the structure of Figures 1 to 5 the cylinder 9 may be provided with a vertically extending rib or bead 80 which engages in a notch 81 in the flange 4, to insure that as the cylinder 9 is lifted toward its elevated position, illustrated in Figure 6, it will be positioned with lugs 31 registered with the clearance notches 32 through which they must pass.

With the structure described, or with either of its modifications, I have found that an unusually palatable quality of coffee can be produced which seems to contain the desirable flavoring elements of the coffee bean without having absorbed those ingredients tending to produce a disagreeable or unpleasant taste. I attribute this result partly to the fact that the coffee grounds are not actually subjected to continuously boiling water as in some of the known methods, and partly to the limited time required for the process. The forced circulation of the liquid repeatedly through the finely divided particles of coffee enables the liquid to pick up in solution, or suspension, the essential flavoring ingredients in about one minute, and apparently this time is too short to permit the unwanted elements to be separated and carried away in the liquid. Although I have found a fine mesh screen ordinarily satisfactory as the pervious bottom 26 of the coffee-containing vessel, it will be understood that a finely perforated sheet metal disk may serve the purpose in some cases, or that, if desired, a filter cloth or paper may be employed to supplement either form of reticulated bottom wall, particularly if the coffee is supplied in finely pulverized form. I have found that either coarsely ground or finely pulverized coffee will produce a satisfactory beverage when treated by the apparatus and method herein disclosed.

If, at any time, the motor 5 should be disabled, or electric current therefor should not be available, the pot 1 may be employed in conjunction with the cylinder 9 and vessel 25, shown in Figure 1 for making coffee by the so-called "drip" method. A suitable quantity of coffee will be placed in the vessel 25 and lowered into the pot 1, either while the water is being heated therein or after it has come to a boil. Then the vessel 25 will be elevated to draining position, as shown in Figure 6, thus allowing the water in the vessel to drain through the coffee, carrying away in solution or suspension a portion of the flavoring material to produce a beverage liquor in the pot 1. The strength of this liquor may be increased by repeating the process of lowering the coffee into the liquid and again raising it to drain position, or, if desired, the vessel 25 may even be left at its lower position while additional heat is applied to the pot 11. Thus the outfit will not be entirely crippled with the motor 5 out of service. And, if desired, the pot 1, together with the cylindrical part 9 and the vessel 25, may be sold separately from the motor unit with the expectation that the motor will be purchased later for completing the outfit and adapting it for operation in accordance with the preferred method herein described.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim as my invention:

1. In combination, a receptacle for liquid, a rotary impeller, a stationary housing for the impeller having an inlet opening in its top wall and a detachable bottom formed with a plurality of small outlets, means removably supporting the impeller and its housing in the receptacle, and a stationary vessel detachably supported on said housing and below it to receive liquid discharged from said outlets, said vessel having a pervious outlet spaced above the bottom of the receptacle.

2. In combination, a receptacle for liquid, a structure supported within said receptacle in spaced relation to the walls thereof and including two chambers both positioned below the normal liquid level therein, said structure comprising a lower chamber for coffee or the like and an upper chamber communicating with the lower chamber and enclosing an impeller mounted for rotation, means driving said impeller in a direction to propel liquid downwardly and forcibly through both chambers, said upper chamber having an inlet admitting liquid from the receptacle and outlet means leading into the upper part of the lower chamber, said lower chamber having its lower portion of pervious formation for discharge of liquid into the receptacle, said outlet means being formed in a partition which separates the upper chamber from the lower chamber and being arranged to discharge liquid laterally into the lower chamber adjacent the under side of said partition to prevent the liquid discharge from boring directly through the contents of the lower chamber.

3. In combination, a receptacle for liquid, a structure supported within said receptacle in spaced relation to the walls thereof and including two chambers both positioned below the normal liquid level therein, said structure comprising a lower chamber for coffee or the like and an upper chamber communicating with the lower chamber and enclosing an impeller mounted for rotation, means driving said impeller in a direction to propel liquid downwardly and forcibly through both chambers, said upper chamber having an inlet admitting liquid from the receptacle and outlet means leading into the upper part of the lower chamber, said lower chamber having its lower portion of pervious formation for discharge of liquid into the receptacle, said outlet means being formed in a partition which separates the upper chamber from the lower chamber, said partition having an upwardly open channel and said means comprising small apertures in the side walls of the channel discharging laterally adjacent the under side of said partition and into the lower chamber.

4. In combination, a receptacle for liquid, a structure supported within said receptacle in spaced relation to the walls thereof and including two chambers both positioned below the normal liquid level therein, said structure comprising a lower chamber for coffee or the like and an upper chamber communicating with the lower chamber and enclosing an impeller mounted for rotation, means driving said impeller in a direction to propel liquid downwardly and forcibly through both chambers, said upper chamber having an inlet admitting liquid from the receptacle and outlet means leading into the upper part of the lower chamber, said lower chamber having its lower portion of pervious formation for discharge of liquid into the receptacle, said outlet means comprising a plurality of small holes formed in a horizontal partition which separates the upper chamber from the lower chamber together with a baffle member of limited width disposed directly below the holes in spaced relation to the partition for deflecting the liquid laterally into the lower chamber.

5. In combination, a receptacle for liquid, a container for coffee or the like supported in said receptacle below the normal liquid level therein, said container having a pervious lower portion and having inlet means for liquid in its upper portion, pumping means super-imposed upon said container operative to circulate the liquid through said inlet means and downwardly through the container, the receptacle having an inwardly extending rim notched at intervals and the container having laterally projecting lugs positioned to pass through the notches of said rim and to seat on the rim when the container is elevated and the lugs are rotated out of registration with said notches.

EMMETT B. MOORE.